(12) United States Patent
Carvalho

(10) Patent No.: US 8,120,228 B2
(45) Date of Patent: Feb. 21, 2012

(54) SLIP RING ASSEMBLY

(75) Inventor: Paul A. Carvalho, Westfield, MA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 399 days.

(21) Appl. No.: 12/386,204

(22) Filed: Apr. 15, 2009

(65) Prior Publication Data

US 2010/0013348 A1 Jan. 21, 2010

Related U.S. Application Data

(60) Provisional application No. 61/134,896, filed on Jul. 15, 2008.

(51) Int. Cl.
*H01R 39/08* (2006.01)
(52) U.S. Cl. .......................... 310/232; 310/143
(58) Field of Classification Search .................. 310/128, 310/143, 147, 232
See application file for complete search history.

(56) References Cited

U.S. PATENT DOCUMENTS

| | | | | |
|---|---|---|---|---|
| 2,453,073 A | * | 11/1948 | Jones | 439/26 |
| 3,066,386 A | * | 12/1962 | Filipczak | 29/597 |
| 3,314,038 A | * | 4/1967 | Rutten | 439/21 |
| 3,976,903 A | * | 8/1976 | Cotton | 310/232 |
| 4,292,502 A | | 9/1981 | Adams | |
| 4,294,500 A | * | 10/1981 | Wilson | 439/26 |
| 4,591,313 A | | 5/1986 | Miyatake et al. | |
| 5,304,036 A | | 4/1994 | Groen et al. | |
| 5,479,060 A | | 12/1995 | Giamati et al. | |
| 5,734,218 A | * | 3/1998 | Crockett et al. | 310/232 |
| 5,770,909 A | | 6/1998 | Rosen et al. | |
| 5,929,607 A | | 7/1999 | Rosenberg et al. | |
| 6,054,947 A | | 4/2000 | Kosowsky | |
| 6,069,341 A | | 5/2000 | Gage et al. | |
| 6,137,082 A | | 10/2000 | Pruden et al. | |
| 6,672,835 B1 | | 1/2004 | Hughes | |
| 6,851,929 B2 | | 2/2005 | Goldberg | |
| 2007/0257153 A1 | | 11/2007 | Froman et al. | |

OTHER PUBLICATIONS

European Search Report, mailed Nov. 17, 2009.

* cited by examiner

*Primary Examiner* — Dang D Le
(74) *Attorney, Agent, or Firm* — Kinney & Lange, P.A.

(57) ABSTRACT

A split slip ring assembly formed from first and second halves of a slip ring having a contact surface for rotational engagement with a stationary brush element for transferring electrical signals there between. The contact surface has a smooth surface at the junction of the first and second halves. A fastener locates the first and second halves to form a ring shape. An electrical contact on the ring carries electrical signals between the slip ring and the brush element. An alignment element aligns the first and second halves to form the smooth surface at their junction.

14 Claims, 4 Drawing Sheets

SLIP RING ASSEMBLY

CROSS-REFERENCE TO RELATED APPLICATION(S)

This application claims priority to U.S. Provisional Pat. App. No. 61/134,896 filed Jul. 15, 2008, which is hereby incorporated by reference in its entirety.

BACKGROUND

This invention relates generally to a assembly used to provide electrical power and communication signals operating on a rotating portion of an aircraft. More particularly, the present invention relates to a slip ring used with an aircraft rotating component such as a propeller, and specifically attached to the aft portion of the propeller hub.

Present propeller designs are connected to the gearbox output shaft using a bolted flange on the propeller hub. The flange connection adds weight to the aircraft. An alternative to a bolted flange is hub that is integral with the gearbox output shaft. The slip ring assembly conventionally employed provides electrical connections between the rotating and non-rotating components of the propeller. Conventional slip rings have non-rotating brushes conductively coupled to one side of each connection and slidingly engaging rotating rings that are conductively coupled to the other side of each connection. In time, the brushes become worn and need to be replaced. Removal of the slip ring, for maintenance or replacement, requires complete removal of the propeller, or in the case of an integral hub and gearbox shaft replacement requires complete removal of the gearbox.

Not providing maintenance and service for slip ring assemblies is not an option since failure of the slip ring, such as by brush failure, may result in the inability of the deicing equipment to properly function.

SUMMARY

A slip ring is formed from two parts that form a smooth surface for the brushes to ride on. The two halves are assembled apart from the propeller hub and are machined to give a uniform surface with a tolerance between the diameters of the two parts being less than 0.1 micron. Thus the smooth surface at the junction when the two components are assembled together has essentially no step that would adversely affect the wear on the stationary brushes.

The two parts are held together by a fastener such as a pair of bolt and nut assemblies at the junction of the two parts. A guide such as a dowel may be used to effectively align the two components to maintain the smooth junction. The slip ring can then be easily attached to a propeller hub or other rotating element. The electrical connections to the slip ring and the stationary brushes are made to transmit the electrical power for deicing the propeller, or another appropriate signal that slip rings are designed to transmit. Due to the split design a jumper wire or other electrical connection is required between the first half of the slip ring and the second half.

DETAILED DESCRIPTION

The present invention is useful for most aircraft propellers, particularly those that have a deicing feature. Slip rings are used to transfer a signal or electric current to or from a stationary component to a rotating component, where the ring rotates and the brushes remain fixed or stationary. The use of a slip ring that could be disassembled separately would permit assembly or replacement of the ring in the field and would eliminate the need for the conventional flange now being used to connect the propeller and gearbox shaft allowing the hub to be integrated with the gearbox shaft.

Figure 1:
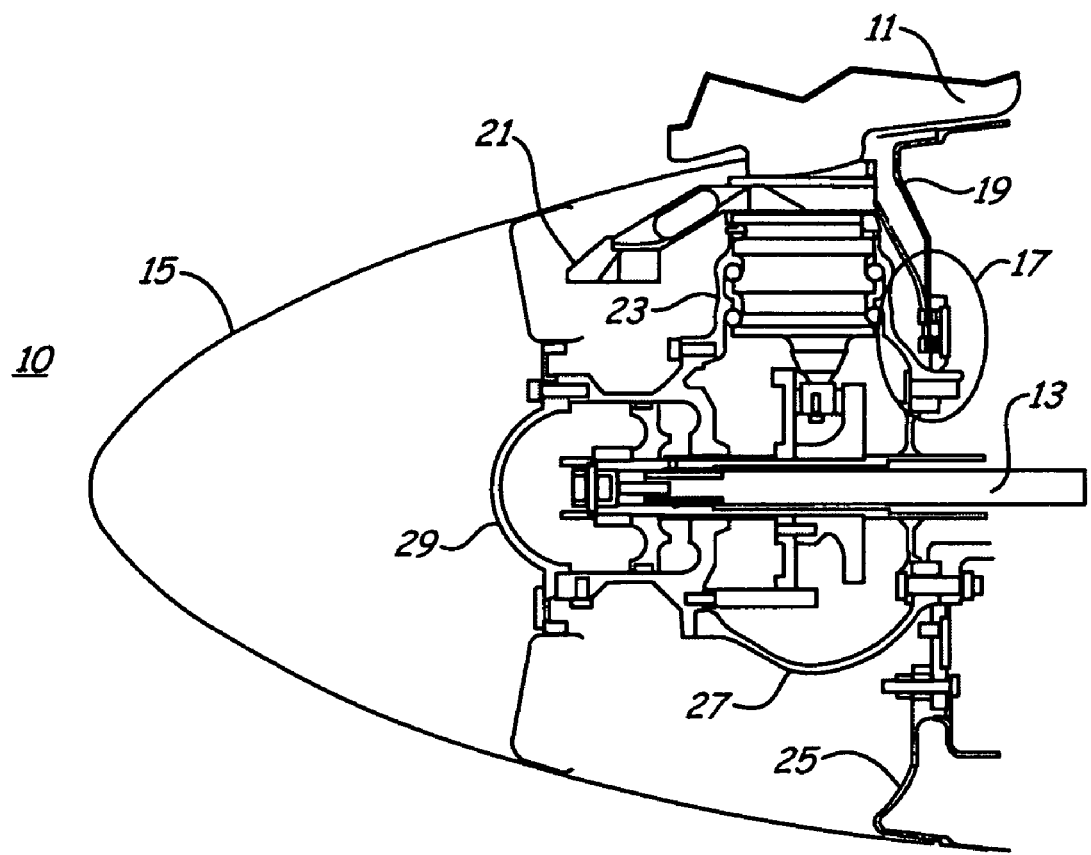
FIG. 1 is a section view of the nose of an aircraft propeller assembly showing the location of the present invention.

A typical aircraft propeller assembly 10 is shown in FIG. 1, with parts cut away. Blade 11, also cut away, is driven by a shaft 13 that drives blade 11 in a conventional manner. Shaft 13 takes the rotation of the gas turbine engine, which may operate at 20,000 rpm, and reduces it to a useable rotation for the blades to 1,200 rpm or the like. FIG. 1 shows where the slip ring assembly 17 is located. Slip ring assembly 17 is attached to the hub using a suitable connection like bolts. Spinner 15 is an aerodynamic shell that houses blade counterweight 21. Blade counterweight 21 serves as a safety device when the system hydraulics, not shown, fail, and aligns blade 11 in a position of least drag, rather than allowing blade 11 to turn to the greatest drag. Other conventional elements in the spinner 15 are blade retention assembly 23, spinner support bulkhead 25, hub 27 and actuator 29. Actuator 29 controls the pitch angle of blade 11.

Figure 2:
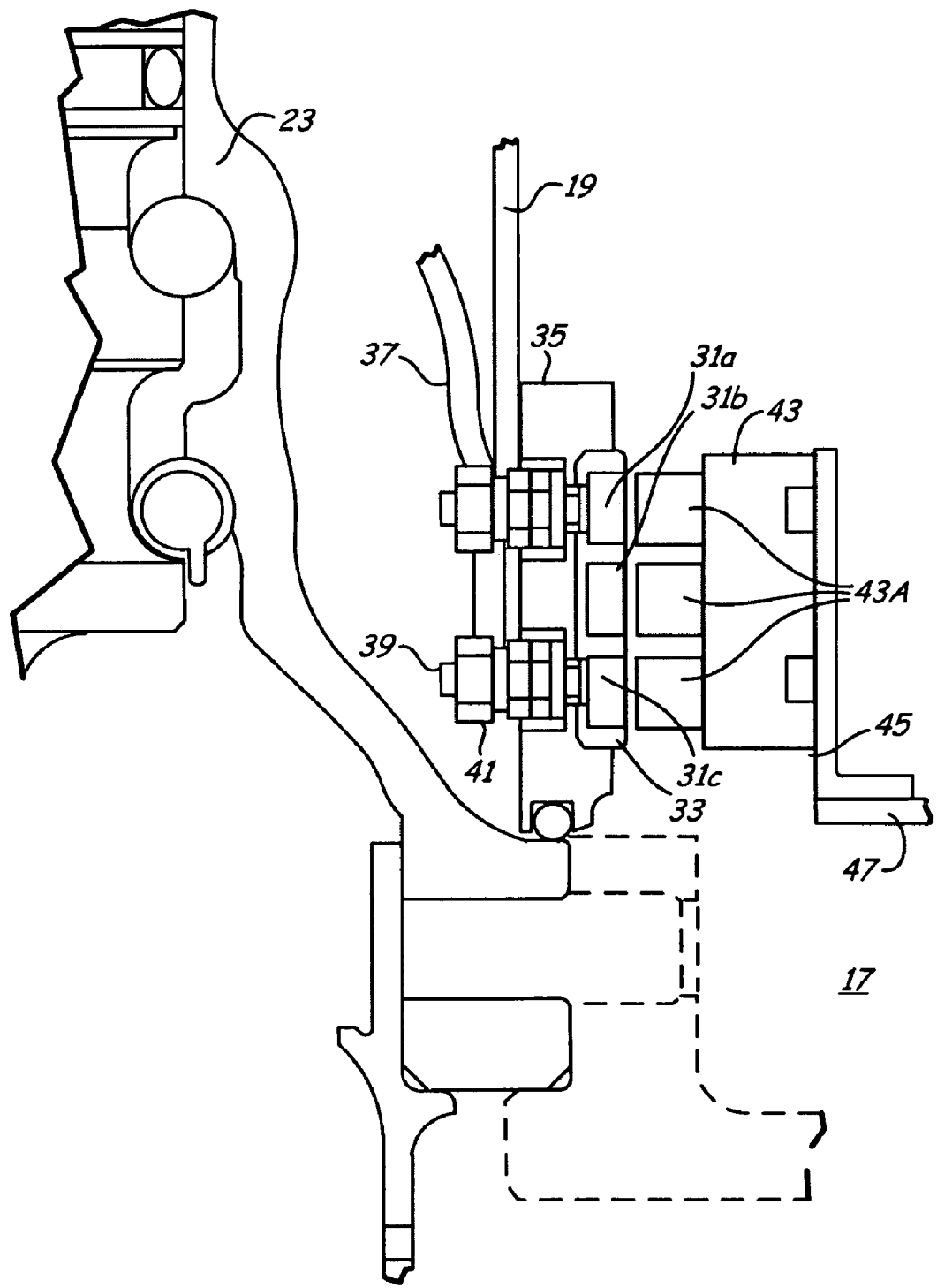
FIG. 2 is an enlarged view of the components shown in circle 17 in FIG. 1.

The slip ring transmits electrical power for blade deicing, and can be used for other purposes such as transmitting control signals. FIG. 2 illustrates the slip ring assembly 17 in greater detail. Three slip rings 31a, 31b and 31c are mounted in a non-conductive slip ring housing 33. Housing 33 is attached to support 19 with a structural slip ring housing 35. Housing 35 is made of aluminum in this assembly though any conductive structural material is suitable. Heater leads 37 are connected to the slip ring housing with threaded studs 39 which are electrically and structurally attached to the back of the slip rings, and retention nuts 41, and the heater leads 37 transmit the electrical current to the de-icer unit, not shown, in a conventional manner. The brushes 43a for slip rings 31a, 31b and 31c are mounted in a housing 43 and attached to the gearbox front housing by bracket 45. Brushes 43a are shown spaced a bit from slip rings 31a, 31b and 31c to illustrate their separate shapes, but in operation, rings and brushes are in contact to function in a normal manner. Housing 35 is rotated by support 19 as the entire propeller assembly 10 rotates. Slip rings 31a, 31b and 31c transmit or receive electrical signals to or from stationary brushes 43a. For example, brushes 43a may transmit electrical energy to slip rings 31a, 31b and 31c to power a de-icer unit.

Figure 3:
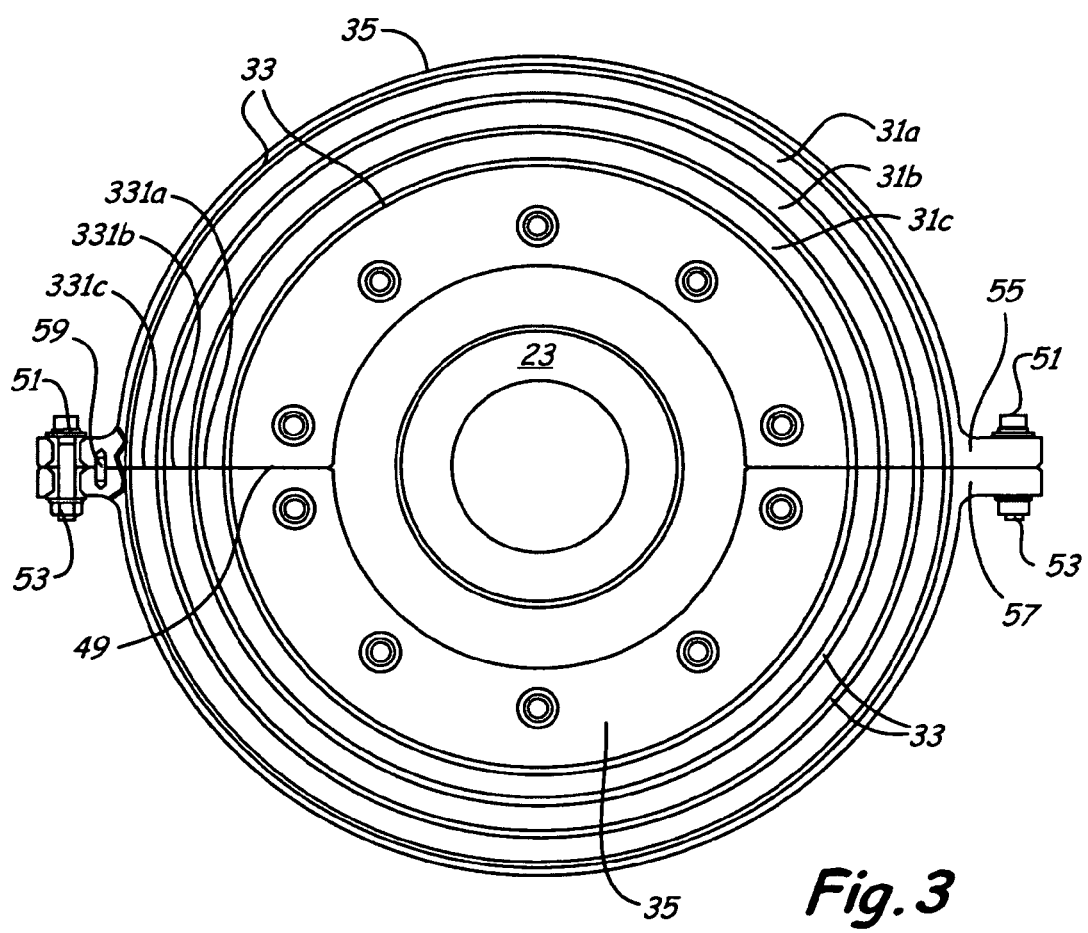
FIG. 3 is a rear elevational view of the assembly of this invention.

FIG. 3 is a rear view of the slip ring assembly with slip rings 31a, 31b and 31c joined together at junction 49 inside non-conductive housing 35 and conductive housing 33. Split line bolts 51 and nuts 53 hold a matched set of bulkheads 55 and 57 to support slip rings 31a, 31b and 31c in place in housings 33 and 35. Bulkheads 55 and 57 are aligned with one or more alignment dowels 59. Not shown in FIG. 3 are jumper wires between each slip ring half to maintain electrical continuity. Prior to assembly and use in an aircraft, the split rings 31a, 31b and 31c are assembled and the inner surfaces are machined to virtually zero tolerance at junction 49 so that the junctions 331a, 331b and 331c have no step or misalignment and present a smooth running surface to the brushes 43a. When reassembled, split rings 31a, 31b and 31c present that smooth running surface to the brushes 43a and function as if the split ring junctions shown as 331a, 331b and 331c were formed from a solid ring rather than from two halves, with smooth running surfaces so the life of the brushes is not affected. Accordingly, when the slip ring assembly 17 is installed in an aircraft or other location where slip rings are used, slip rings 31a, 31b and 31c of FIG. 2 function as any slip ring does. When the rings have become worn or damaged, however, it is a simple matter to remove nuts 53 from bolt 51 without having to disassemble anything else, and they can be repaired or replaced at a substantial savings in time and labor.

Figure 4:
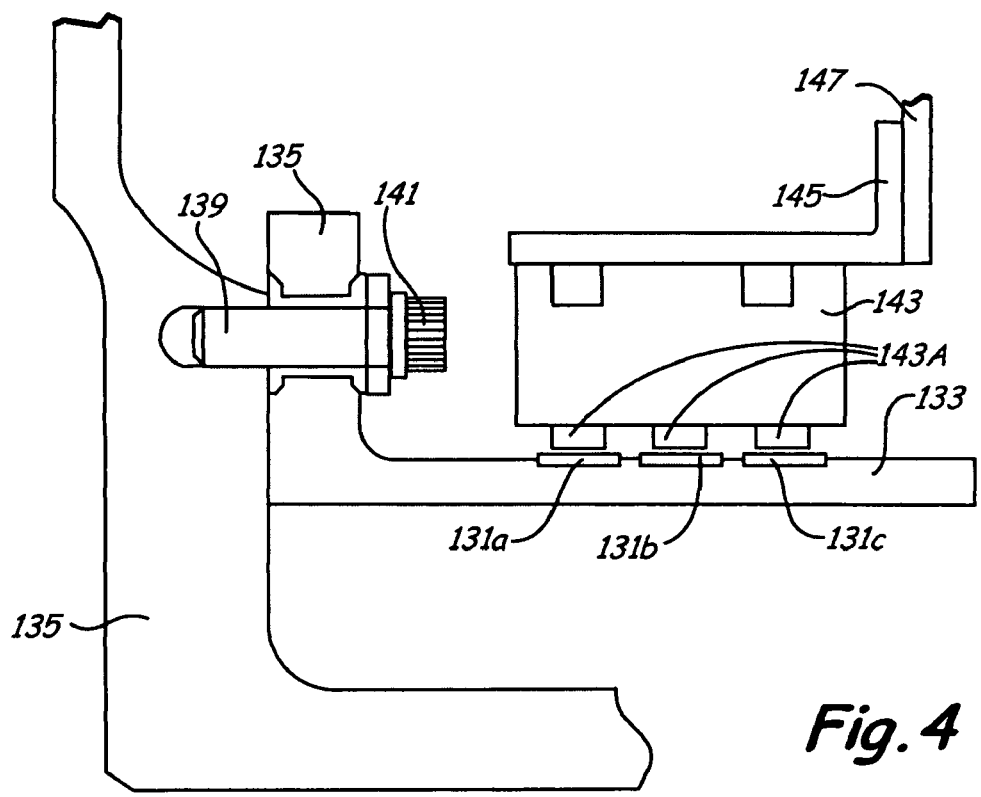
FIG. 4 is an alternative view of a portion of the assembly in FIG. 3.

FIG. 4 illustrates a different orientation for split slip rings 131a, 131b and 131c which are mounted on non-conductive housing 133, which is in turn mounted by bolts 139 and nuts 141 on hub 135. Conductive housing 135, split slip rings 131a, 131b and 131c operate in a conventional manner with brushes 143a, which are mounted in housing 143 and attached to gearbox 147 with bracket 145. Again split slip rings 131a, 131b and 131c are first assembled outside the location of use, and junction 149 is machined to have a smooth running surface. Then split slip rings 131a, 131b and 131c are put into location and they function as other slip rings do and are in contact with brushes 143a, rather than spaced as shown for illustration purposes.

Figure 5:
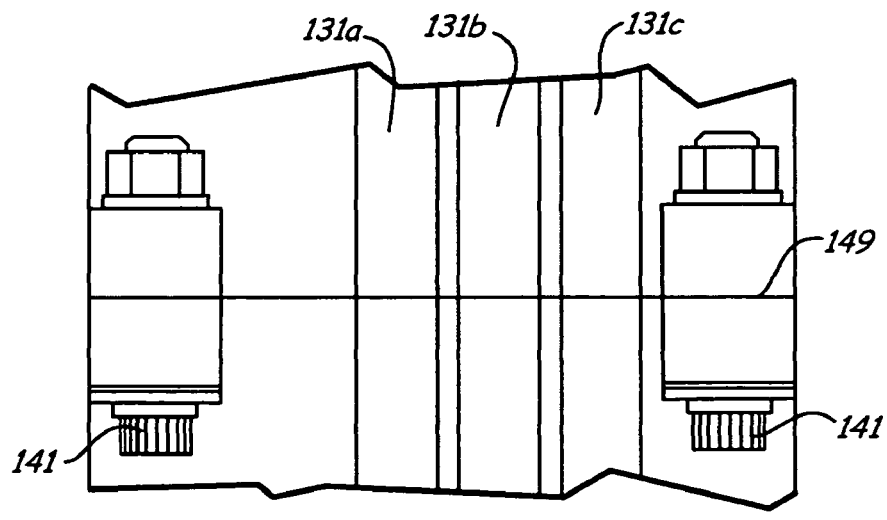
FIG. 5 is a view of a part of the assembly in FIG. 4.

FIG. 5 shows how the junction 149 mates the two halves of split slip rings 131a, 131b and 131c. They are held in place with bolts 139 (in FIG. 4) and nuts 141. Junction 149 has been machined to join the two halves of split slip rings 131a, 131b and 131c to function as conventional solid rings. Jumper wires are required between each slip ring half.

Although the present invention has been described with reference to preferred embodiments, workers skilled in the art will recognize that changes may be made in form and detail without departing from the spirit and scope of the invention.

The invention claimed is:

1. A slip ring assembly, comprising:
first and second halves of a slip ring having a contact surface for rotational engagement with a stationary brush element for transferring electrical signals there between, the contact surface having a smooth surface at the junction of the first and second halves, wherein the ring halves have a flat, planar shape and engage the stationary brush element to transfer electrical signals in an axial direction;
a fastener locating the first and second halves to form a ring shape; and
an electrical contact on the ring for carrying electrical signals.

2. The assembly of claim 1, wherein the fastener includes an alignment element for aligning the first and second halves to form the smooth surface at their junction.

3. The assembly of claim 2, wherein the alignment element for aligning the first and second halves to form the smooth surface at their junction is selected from alignment dowels and alignment keys.

4. The assembly of claim 1, which further includes a stationary brush element in contact with the rotating surface for transferring electrical signals there between, the assembly being mounted in operable relationship with an aircraft propeller assembly.

5. The assembly of claim 1, wherein the fastener includes at least two pairs of split line bolts and nuts.

6. The assembly of claim 1, wherein the first and second halves are assembled and machined to product a smooth junction and thereafter assembled on a rotating element.

7. The assembly of claim 6, wherein the smooth junction has a tolerance of less than 0.1 micron.

8. A slip ring assembly, comprising:
first and second halves of a slip ring having a contact surface for rotational engagement with a stationary brush element for transferring electrical signals there between, the inner surface having a smooth surface at the junction of the first and second halves, wherein the ring halves have a flat, planar shape and engage the stationary brush element to transfer electrical signals in an axial direction;
an alignment element for aligning the first and second halves to form the smooth surface at their junction;
a fastener locating the first and second halves to form a ring shape; and
an electrical contact on the ring for carrying electrical signals.

9. The assembly of claim 8, wherein the alignment element for aligning the first and second halves to form the smooth surface at their junction is selected from alignment dowels and alignment keys.

10. The assembly of claim 9, wherein the first and second halves are assembled and machined to product a smooth junction and thereafter assembled on a rotating element.

11. The assembly of claim 10, wherein the smooth junction has a tolerance of less than 0.1 micron.

12. A slip ring assembly mounted on a propeller hub and gearbox assembly having a drive shaft for driving the hub, comprising:
first and second halves of a slip ring having a contact surface for rotational engagement with a stationary brush element for transferring electrical signals there between, the contact surface having a smooth surface at the junction of the first and second halves, wherein the ring halves have a flat, planar shape and engage the stationary brush element to transfer electrical signals in an axial direction;
an alignment element for aligning the first and second halves to form the smooth surface having a tolerance of less than 0.1 micron at their junction;
a fastener locating the first and second halves to form a ring shape;
a stationary brush element mounted in the slip ring for rotational engagement with the surface; and
an electrical contact on the ring for carrying electrical signals between the hub and the gearbox assembly.

13. The assembly of claim 12, wherein the slip ring assembly is used with a heater lead on a propeller on the propeller hub.

14. The assembly of claim 12, wherein removal of the fastener in the slip ring assembly and separating the first and second halves of the slip ring exposes the slip rings for replacement or repair.

* * * * *